(12) United States Patent
Hatakeyama

(10) Patent No.: US 7,121,161 B2
(45) Date of Patent: Oct. 17, 2006

(54) PARALLEL SHAFT TRANSMISSION

(75) Inventor: Kazuma Hatakeyama, Saitama (JP)

(73) Assignee: Honda Motor Co. Ltd., Tokyo (JP)

( * ) Notice: Subject to any disclaimer, the term of this patent is extended or adjusted under 35 U.S.C. 154(b) by 108 days.

(21) Appl. No.: 10/898,374

(22) Filed: Jul. 26, 2004

(65) Prior Publication Data

US 2005/0028625 A1 Feb. 10, 2005

(30) Foreign Application Priority Data

Aug. 7, 2003 (JP) .............................. 2003-288687

(51) Int. Cl.
*F16H 3/08* (2006.01)

(52) U.S. Cl. ..................... 74/359; 74/331; 74/333; 74/335

(58) Field of Classification Search ................ 74/331, 74/333, 325, 359
See application file for complete search history.

(56) References Cited

U.S. PATENT DOCUMENTS

| 4,682,516 A |   | 7/1987 | Okubo |         |
|-------------|---|--------|-------|---------|
| 4,858,495 A |   | 8/1989 | Horsch |        |
| 4,938,085 A | * | 7/1990 | Suzuki et al. | 74/15.2 |
| 5,445,041 A |   | 8/1995 | Zaiser et al. |     |
| 6,860,168 B1 | * | 3/2005 | Kobayashi | 74/331 |
| 2003/0187561 A1 | * | 10/2003 | Shimaguchi | 701/51 |

FOREIGN PATENT DOCUMENTS

| DE | 195 24 233 A1 | 1/1997 |
| EP | 1 026 423 A2 | 8/2000 |
| JP | 58054257 | 3/1983 |
| JP | 01303348 A | * 12/1989 |
| JP | 7-94854 | 10/1995 |
| JP | 2000-220700 | 8/2000 |
| WO | WO 97/37835 | 10/1997 |

* cited by examiner

*Primary Examiner*—Charles A Marmor
*Assistant Examiner*—David D. Le
(74) *Attorney, Agent, or Firm*—Westerman, Hattori, Daniels & Adrian, LLP.

(57) ABSTRACT

An input shaft 10 is connected rotationally with an intermediary shaft 20 through a main drive gear GMV, a connecting idle gear GCC and a connecting driven gear GCN and also connected rotationally with a countershaft 30 through the main drive gear GMV and a main driven gear GMN. A fourth speed drive gear G4V, which is provided on the countershaft 30, meshes with a fourth and sixth speed drive gear G46V, which is provided rotatably over the input shaft 10. Both the fourth and sixth speed drive gear G46V and a fifth speed drive gear G5V, which is provided rotatably over the intermediary shaft 20, mesh with a fourth, fifth and sixth speed driven gear G456N, which is provided on the output shaft 50.

7 Claims, 5 Drawing Sheets

Fig. 2

| | CT1 | CT2 | CT3 | CT4 | CT5 | CT6 | CTD |
|---|---|---|---|---|---|---|---|
| Neutral | OFF | OFF | OFF | OFF | OFF | OFF | Fourth speed drive gear engaged |
| Forward first speed | ON | → | → | → | → | → | → |
| Forward second speed | OFF | ON | → | → | → | → | → |
| Forward third speed | → | OFF | ON | → | → | → | → |
| Forward fourth speed | → | → | OFF | ON | → | → | → |
| Forward fifth speed | → | → | → | OFF | ON | → | → |
| Forward sixth speed | → | → | → | → | OFF | ON | → |
| Reverse drive | → | → | → | ON | → | → | Reverse drive gear engaged |

Fig. 3

| | CT1 | CT2 | CT3 | CT4 | CT5 | CT6 |
|---|---|---|---|---|---|---|
| Modification example 1 | → | → | → | → | CT5 | CT6 |
| Modification example 2 | → | → | CT4 | CT6 | CT4 | CT5 |
| Modification example 3 | → | → | CT5 | → | CT3 | → |
| Modification example 4 | → | CT3 | CT4 | CT4 | → | CT6 |
| Modification example 5 | → | → | CT5 | CT2 | CT5 | → |
| Modification example 6 | → | → | → | CT6 | CT4 | CT4 |
| Modification example 7 | → | → | CT6 | CT4 | CT2 | CT5 |
| Modification example 8 | → | CT4 | CT5 | CT6 | → | CT3 |
| Modification example 9 | → | → | CT6 | → | CT3 | CT5 |
| Modification example 10 | → | CT5 | → | CT2 | → | CT4 |
| Modification example 11 | → | → | → | CT4 | CT2 | CT3 |

Fig. 5

| | CT1 | CT2 | CT3 | CT4 | CT5 | CT6 | CT7 | CT8 | CTD |
|---|---|---|---|---|---|---|---|---|---|
| Neutral | OFF | OFF | OFF | OFF | OFF | OFF | OFF | OFF | Fourth speed drive gear engaged |
| Forward first speed | ON | → | → | → | → | → | → | → | → |
| Forward second speed | OFF | ON | ON | → | → | → | → | → | → |
| Forward third speed | → | OFF | ON | → | → | → | → | → | → |
| Forward fourth speed | → | → | OFF | ON | → | → | → | → | → |
| Forward fifth speed | → | → | → | OFF | ON | → | → | → | → |
| Forward sixth speed | → | → | → | → | OFF | ON | → | → | → |
| Forward seventh speed | → | → | → | → | → | OFF | ON | → | → |
| Forward eighth speed | → | → | → | ON | → | → | OFF | ON | → |
| Reverse drive | → | → | → | → | → | → | → | OFF | Reverse drive gear engaged |

PARALLEL SHAFT TRANSMISSION

RELATED APPLICATIONS

This application claims the priority of Japanese Patent Application No. 2003-288687 filed on Aug. 7, 2003, which is incorporated herein by reference.

FIELD OF THE INVENTION

The present invention relates to a parallel shaft transmission, in which gears are provided over a plurality of shafts disposed in parallel with one another, the gears being meshed in pairs so that the engagement and disengagement of gears to corresponding ones of the shafts establishes a power transmission path through the shafts in engagement to achieve a desirable speed change ratio, which corresponds to a momentary gear ratio of the transmission.

BACKGROUND OF THE INVENTION

Such parallel shaft transmissions are used in various powered machines including automobiles. In recent years, there has been a tendency that transmissions for use in vehicles are equipped with increasing numbers of speed change ratios because of demands for improvements in driving performance and of concerns on environmental effect. As a result, some transmissions that have more than five speed change ratios for forward drive have been developed for practical use. Generally, as the numbers of speed change ratios of transmissions increase, the numbers of gears disposed over the shafts also increase. This is said equally not only on vehicular transmissions but also on other types of transmissions. Therefore, transmissions tend to increase their sizes especially in the direction of their shafts. However, transmissions are designed to occupy certain limited amounts of space in specific machines or equipment in which they are intended to be installed. Therefore, various ideas have been applied to make the sizes of transmissions as compact as possible when the transmissions are designed to have increasing numbers of speed change ratios. Particularly in designing vehicular transmissions, whose sizes are limited by the sizes of respective vehicles accommodating the corresponding transmissions, it is important to take every measure that can make the transmissions as compact as possible.

Various such measures have been proposed to reduce the sizes of parallel shaft transmissions in axial direction. For example, a structural arrangement is known in which an extra shaft (intermediary shaft) is added between the input and output shafts of a transmission to reduce the number of gears per shaft (for example, refer to Japanese Laid-Open Patent Publication No. 2000-220700). In addition to this structural arrangement, another structural arrangement enables gears disposed on the output shaft to mesh with gears provided over the input shaft, to mesh also with gears provided over the intermediary shaft (for example, refer to Japanese Laid-Open Patent Publication No. 7(1995)-94854). In this arrangement, a gear on the output shaft is used commonly to establish two different speed change ratios, so that the number of gears disposed on the output shaft is made relatively small. Moreover, the gear on the input shaft and that on the intermediary shaft both meshing with such a commonly used gear on the output shaft are placed in a common plane in the transmission. As a result, the size of the transmission in the longitudinal direction of the shafts is much smaller than a similar transmission designed otherwise.

However, for recently developed transmissions with large numbers of speed change ratios, it is difficult to achieve a sufficient size reduction in axial direction by the above described structural arrangement in which a gear provided on the output shaft is used commonly for achieving two different speed change ratios. Therefore, there is a need for a new structural arrangement that can effect a size reduction in larger scale.

SUMMARY OF THE INVENTION

To solve the above mentioned problem, it is an object of the present invention to provide a parallel shaft transmission that has a compact structure with a relatively small dimension in its axial direction even though the transmission is equipped with a large number of speed change ratios.

A parallel shaft transmission according to the present invention comprises an input shaft, a first idle shaft (for example, the connecting idle shaft 40 described in the following embodiment), an intermediary shaft, a countershaft and an output shaft, which are disposed in parallel with one another. The parallel shaft transmission further comprises an input-shaft first gear (for example, the main drive gear GMV described in the following embodiment) and an input-shaft second gear (for example, also the main drive gear GMV described in the following embodiment), which are provided on the input shaft, an input-shaft third gear (for example, the fourth and sixth speed drive gear G46V described in the following embodiment), which is provided rotatably on the input shaft, first clutching means (for example, the sixth speed clutch CT6 described in the following embodiment), which connects or disconnects the input-shaft third gear to or from the input shaft, a first idle gear (for example, the connecting idle gear GCC described in the following embodiment), which is provided on the first idle shaft to mesh with the input-shaft first gear, an intermediary shaft first gear (for example, the connecting driven gear GCN described in the following embodiment), which is provided on the intermediary shaft to mesh with the first idle gear, an intermediary shaft second gear (for example, the fifth speed drive gear G5V described in the following embodiment), which is provided rotatably on the intermediary shaft, second clutching means (for example, the fifth speed clutch CT5 described in the following embodiment), which connects or disconnects the intermediary shaft second gear to or from the intermediary shaft, an output-shaft first gear (for example, the fourth, fifth and sixth speed driven gear G456N described in the following embodiment), which is provided on the output shaft to mesh with the input-shaft third gear and with the intermediary shaft second gear, a countershaft first gear (for example, the main driven gear GMN described in the following embodiment), which is provided on the countershaft to mesh with the input-shaft second gear, a countershaft second gear (for example, the fourth speed drive gear G4V described in the following embodiment), which is provided on the countershaft to mesh with the input-shaft third gear, and power-switching means (for example, the fourth speed clutch CT4 and the selective clutch CTD described in the following embodiment), which enables or disables power transmission between the countershaft first gear and the countershaft second gear. It is preferable that the input-shaft first gear and the input-shaft second gear comprise an identical gear.

In this parallel shaft transmission, the rotational power of a prime mover (for example, an engine), which is input to the input shaft of the transmission, is transmitted to the intermediary shaft through the input-shaft first gear, the first idle gear and the intermediary shaft first gear. As a result, the intermediary shaft rotates in the same rotational direction as the input shaft. Here, if (1) the input-shaft third gear is disconnected from the input shaft, if (2) the intermediary shaft second gear is disconnected from the intermediary shaft, and if (3) the power transmission between the countershaft first gear and the countershaft second gear is disabled, then the transmission is set in a neutral condition, where the rotational power of the prime mover is not transmitted to the output shaft. From this neutral condition, if the input-shaft third gear is connected to the input shaft, then the transmission is set into a first speed change condition (this speed change condition corresponds to the forward sixth speed condition described in the following embodiment). In the first speed change condition, the rotational power is transmitted from the input shaft by the first clutching means through the input-shaft third gear and the output-shaft first gear to the output shaft, so that the output shaft rotates in one direction (forward direction). Also, from the above mentioned neutral condition, if the intermediary shaft second gear is connected to the intermediary shaft, then the transmission is set into a second speed change condition (this speed change condition corresponds to the forward fifth speed condition described in the following embodiment). In the second speed change condition, the rotational power is transmitted from the input shaft through the input-shaft first gear, the first idle gear and the intermediary shaft first gear to the intermediary shaft and then by the second clutching means through the intermediary shaft second gear and the output-shaft first gear to the output shaft, so that the output shaft rotates in the above mentioned forward direction. Also, from the above mentioned neutral condition, if the power transmission between the countershaft first gear and the countershaft second gear is enabled, then the transmission is set into a third speed change condition (this speed change condition corresponds to the forward fourth speed condition described in the following embodiment). In the third speed change condition, the rotational power is transmitted from the input shaft through the input-shaft second gear, the countershaft first gear, the countershaft second gear, the input-shaft third gear (rotating over the input shaft) and the output-shaft first gear to the output shaft, so that the output shaft rotates in the above mentioned forward direction.

The parallel shaft transmission may further comprise an input-shaft fourth gear (for example, the third speed and reverse drive gear G3RV described in the following embodiment), which is provided rotatably on the input shaft, third clutching means (for example, the third speed clutch CT3 described in the following embodiment), which connects or disconnects the input-shaft fourth gear to or from the input shaft, an intermediary shaft third gear (for example, the second speed drive gear G2V described in the following embodiment), which is provided rotatably on the intermediary shaft, fourth clutching means (for example, the second speed clutch CT2 described in the following embodiment), which connects or disconnects the intermediary shaft third gear to or from the intermediary shaft, and an output-shaft second gear (for example, the second and third speed and reverse driven gear G23RN described in the following embodiment), which is provided on the output shaft to mesh with the input-shaft fourth gear and with the intermediary shaft third gear.

By this arrangement, after the above mentioned conditions (1), (2) and (3) are satisfied, additionally, if (4) the input-shaft fourth gear is disconnected from the input shaft, and if (5) the intermediary shaft third gear is disconnected from the intermediary shaft, then the transmission is set in a neutral condition. From this neutral condition, if the input-shaft fourth gear is connected to the input shaft, then the transmission is set into a fourth speed change condition (this speed change condition corresponds to the forward third speed condition described in the following embodiment). In the fourth speed change condition, the rotational power is transmitted from the input shaft by the third clutching means through the input-shaft fourth gear and the output-shaft second gear to the output shaft, so that the output shaft rotates in the above mentioned forward direction. Also, from the above neutral condition, if the intermediary shaft third gear is connected to the intermediary shaft, then the transmission is set into a fifth speed change condition (this speed change condition corresponds to the forward second speed condition described in the following embodiment). In the fifth speed change condition, the rotational power is transmitted from the input shaft through the input-shaft first gear, the first idle gear, the intermediary shaft first gear to the intermediary shaft and then by the fourth clutching means through the intermediary shaft third gear and the output-shaft second gear to the output shaft, so that the output shaft rotates in the above mentioned forward direction.

In the parallel shaft transmission according to the present invention, preferably, the countershaft second gear is provided rotatably on the countershaft, and the power-switching means includes fifth clutching means (for example, the selective clutch CTD described in the following embodiment), which connects or disconnects the countershaft second gear to or from the countershaft. Furthermore, the transmission may comprise a countershaft third gear (for example, the reverse drive gear GRV described in the following embodiment), which is provided rotatably on the countershaft, a second idle shaft, which is disposed in parallel with the input shaft, a second idle gear (for example, the reverse idle gear GRI described in the following embodiment), which is provided on the second idle shaft to mesh with the countershaft third gear and with the input-shaft fourth gear, and sixth clutching means (for example, the selective clutch CTD described in the following embodiment), which connects or disconnects the countershaft third gear to or from the countershaft.

By this arrangement, from the above mentioned neutral condition, if the power transmission from the countershaft first gear to the countershaft is enabled while the countershaft second gear is disconnected from the countershaft, and if the countershaft third gear is connected to the countershaft, then the transmission is set into a sixth speed change condition (this speed change condition corresponds to the reverse speed condition described in the following embodiment). In the sixth speed change condition, the rotational power is transmitted from the input shaft through the input-shaft second gear and the countershaft first gear to the countershaft and then by the sixth clutching means through the countershaft third gear, the second idle gear, the input-shaft fourth gear (rotating over the input shaft) and the output-shaft second gear to the output shaft, so that the output shaft rotates in the (reverse) direction opposite to the above mentioned forward direction.

In the above described parallel shaft transmission according to the present invention, preferably, the countershaft first gear is provided rotatably on the countershaft, and the power-switching means includes seventh clutching means (for example, the fourth speed clutch CT4 described in the following embodiment), which connects or disconnects the countershaft first gear to or from the countershaft. In addition, the fifth clutching means and the sixth clutching means comprise one selective clutching means (for example, the selective clutch CTD described in the following embodiment), which connects selectively either the countershaft second gear or the countershaft third gear to the countershaft. As described above, the parallel shaft transmission according to the present invention achieves a plurality of speed change ratios for forward rotation. However, the number of the gears to be provided over the output shaft for achieving the number of forward speed change ratios is reduced greatly by using a gear (output-shaft first gear) provided over the output shaft commonly for rotating the output shaft in the forward direction in the first speed change condition, in the second speed change condition and in the third speed change condition. Therefore, the size of the transmission can be made correspondingly small in its axial direction. As a result, the parallel shaft transmission according to the present invention achieves a compact construction even though it is equipped with a large number of speed change ratios.

Furthermore, in the above described parallel shaft transmission, if the input-shaft first gear and the input-shaft second gear comprise an identical gear, then the gear provided on the input shaft for rotating the intermediary shaft can be commonly used also for rotating the countershaft. This gear reduction further improves the compactness of the transmission in its axial direction.

In the above described case where the parallel shaft transmission comprises an input-shaft fourth gear, which is provided rotatably on the input shaft, third clutching means, which connects or disconnects the input-shaft fourth gear to or from the input shaft, an intermediary shaft third gear, which is provided rotatably on the intermediary shaft, fourth clutching means, which connects or disconnects the intermediary shaft third gear to or from the intermediary shaft, and an output-shaft second gear, which is provided on the output shaft to mesh with the input-shaft fourth gear and with the intermediary shaft third gear, the transmission is equipped with additional two speed change ratios for forward rotation. However, the size of the transmission in its axial direction increases only by the degree of one gear because the gear (output-shaft second gear) provided over the output shaft for rotating the output shaft in the forward direction in the fourth speed change condition is used commonly also in the fifth speed change condition. Therefore, the transmission still maintains a relatively small dimension in its axial direction notwithstanding the large number of speed change ratios.

Also, in the above described case of the parallel shaft transmission where the countershaft second gear is provided rotatably on the countershaft, and the power-switching means includes fifth clutching means, which connects or disconnects the countershaft second gear to or from the countershaft, if the transmission comprises a second idle shaft, which is disposed in parallel with the input shaft, a countershaft third gear, which is provided rotatably on the countershaft, a second idle gear, which is provided on the second idle shaft to mesh with the countershaft third gear and with the input-shaft fourth gear, and sixth clutching means, which connects or disconnects the countershaft third gear to or from the countershaft, then the transmission is equipped with a reverse speed change ratio without any increase in the size of the transmission in its axial direction. The reason is that the gear (output-shaft second gear) provided over the output shaft for rotating the output shaft in the forward direction in the fourth speed change condition as well as in the fifth speed change condition is used commonly also for rotating the output shaft in the reverse direction in the sixth speed change condition. Therefore, the transmission still maintains a relatively small dimension in its axial direction notwithstanding this increased number of speed change ratios.

In the above described parallel shaft transmission, the countershaft second gear and the countershaft third gear are never connected simultaneously to the countershaft. Therefore, while the countershaft first gear is provided rotatably over the countershaft, the power-switching means comprises seventh clutching means, which connects or disconnects the countershaft first gear to or from the countershaft. In addition, the fifth clutching means and the sixth clutching means comprise one selective clutching means, which connects either the countershaft second gear or the countershaft third gear to the countershaft. This arrangement further lightens the transmission and improves the compactness.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 2 is a table describing relations between the condition of first~sixth clutches and a selective clutch and the speed change ratio of the first embodiment transmission.

FIG. 3 is a table listing examples of modification of the first embodiment, with each example of modification being described by contrasting the alphanumeric codes of the clutches in the first embodiment with those of each row of the modification list.

FIG. 5 is a table describing relations between the condition of first~eighth clutches and a selective clutch and the speed change ratio of the second embodiment transmission.

DESCRIPTION OF THE PREFERRED EMBODIMENTS

Figure 1:
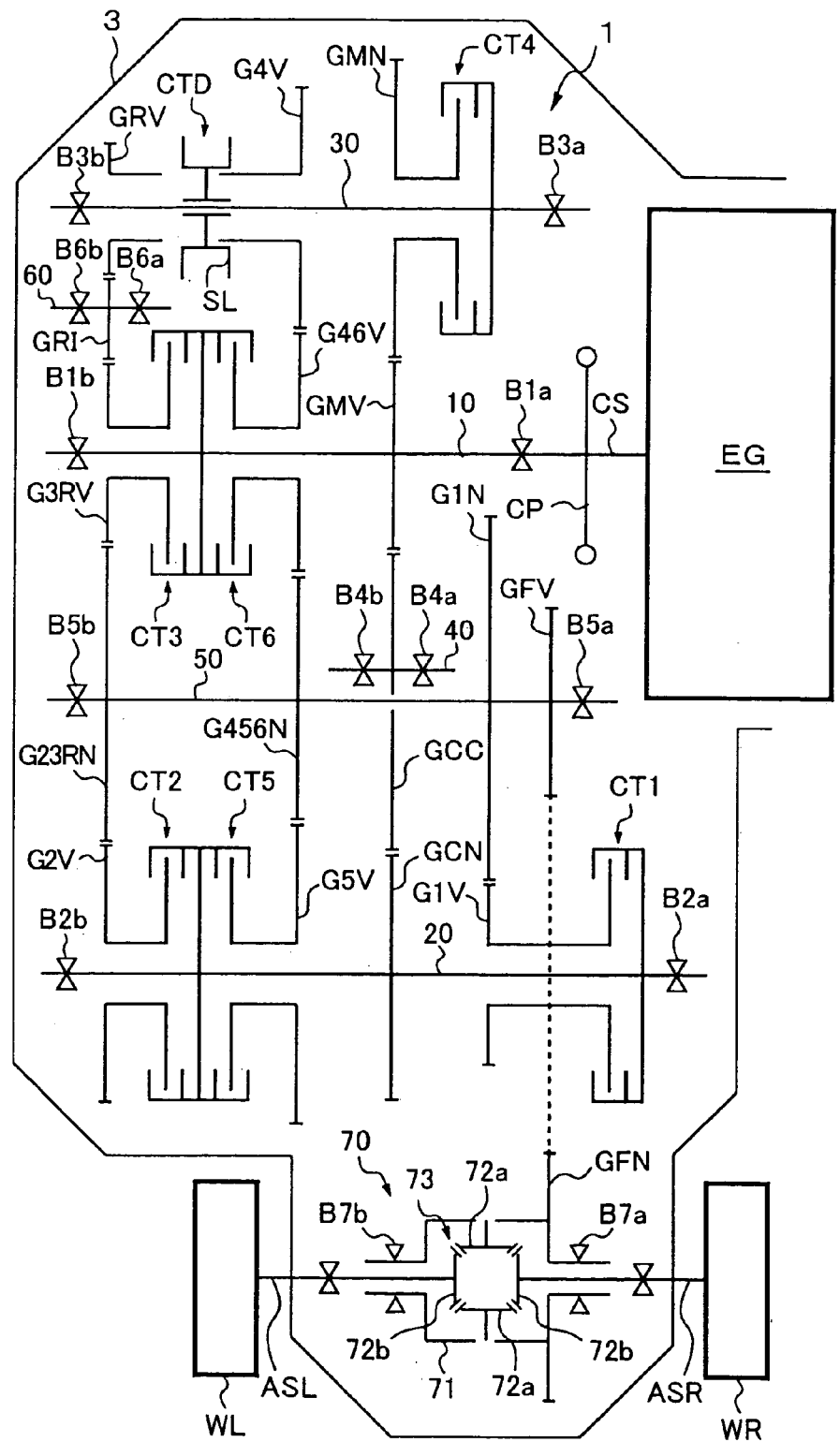
FIG. 1 is a skeleton diagram describing schematically the construction of a parallel shaft transmission as a first embodiment according to the present invention.

Now, preferred embodiments according to the present invention are described in reference to the drawings. FIG. 1 shows a first embodiment of parallel shaft transmission according to the present invention (hereinafter referred to as "the transmission"). The transmission 1 as a first embodiment converts the torque and rotational speed input from an engine EG and transmits the rotational power of the engine EG to a differential mechanism 70, which is connected rotationally to right and left drive wheels WL and WR.

The transmission 1 has an input shaft 10, a connecting idle shaft 40, an intermediary shaft 20, a countershaft 30, an output shaft 50 and a reversing idle shaft 60, all of which are disposed in parallel with one another and accommodated together with the differential mechanism 70 in a transmission case 3. The input shaft 10 is supported rotatably by bearings B1a and B1b and connected through a coupling mechanism CP to the crank-shaft CS of the engine EG. Over the input shaft 10, disposed from the side of the engine EG (i.e., from the right side of the drawing in FIG. 1) are a main drive gear GMV, a fourth and sixth speed drive gear G46V, a sixth speed clutch CT6, a third speed clutch CT3 and a third speed and reverse drive gear G3RV, which are all rotatable with respect to the input shaft 10. The sixth speed clutch CT6 engages or disengages the fourth and sixth speed drive gear G46V to or from the input shaft 10, and the third speed clutch CT3 engages or disengages the third speed and reverse drive gear G3RV to or from the input shaft 10. Both the clutches CT6 and CT3 are friction clutches each incorporating a hydraulically actuated piston. Such clutch is well-known in this field, so no additional description of these clutches is presented here.

The intermediary shaft 20 is supported also rotatably by bearings B2a and B2b. On this shaft, disposed from the side of the engine EG (i.e., from the right side of the drawing in FIG. 1) are a first speed clutch CT1, a first speed drive gear G1V, a connecting driven gear GCN, a fifth speed drive gear G5V, a fifth speed clutch CT5, a second speed clutch CT2 and a second speed drive gear G2V. Here, the first speed drive gear G1V, the fifth speed drive gear G5V and the second speed drive gear G2V are each disposed rotatably over the intermediary shaft 20, but the connecting driven gear GCN is fixed on the intermediary shaft 20. The first speed clutch CT1 engages or disengages the first speed drive gear G1V to or from the intermediary shaft 20, the fifth speed clutch CT5 engages or disengages the fifth speed drive gear G5V to or from the intermediary shaft 20, and the second speed clutch CT2 engages or disengages the second speed drive gear G2V to or from the intermediary shaft 20. These three clutches CT1, CT5 and CT2 are friction clutches of the same type as the above mentioned clutches CT6 and CT3, so no additional description of the clutches is provided here.

The countershaft 30 is supported also rotatably by bearings B3a and B3b. Over this shaft, disposed from the side of the engine EG (i.e., from the right side of the drawing in FIG. 1) are a fourth speed clutch CT4, a main driven gear GMN, a fourth speed drive gear G4V, a selective clutch CTD and a reverse drive gear GRV. The main driven gear GMN, the fourth speed drive gear G4V and the reverse drive gear GRV are provided each rotatably over the countershaft 30. The fourth speed clutch CT4 engages or disengages the main driven gear GMN to or from the countershaft 30, which is a well-known friction clutch with a hydraulically actuated piston. The selective clutch CTD, which is provided axially slidably on the countershaft 30, is integrated with a selector SL whose position over the countershaft 30 is controlled to shift axially by the operation of a hydraulic mechanism (not shown). When the selector SL is shifted in either direction, the dog teeth (not shown) of the selective clutch CTD clutches the closer side of the fourth speed drive gear G4V or that of the reverse drive gear GRV, correspondingly. As a result, either the fourth speed drive gear G4V or the reverse drive gear GRV is connected rotationally to the countershaft 30. In other words, if the selector SL of the selective clutch CTD is shifted onto the side of the fourth speed drive gear G4V (rightward in the drawing of FIG. 1), then the fourth speed drive gear G4V is connected to the countershaft 30. On the other hand, if the selector SL is shifted onto the side of the reverse drive gear GRV (leftward in the drawing of FIG. 1), then the reverse drive gear GRV is connected to the countershaft 30.

The connecting idle shaft 40 is supported also rotatably by bearings B4a and B4b, and a connecting idle gear GCC is provided fixedly on this shaft. The connecting idle gear GCC always meshes both with the main drive gear GMV, which is provided on the input shaft 10, and with the connecting driven gear GCN, which is provided on the intermediary shaft 20.

The output shaft 50 is supported also rotatably by bearings B5a and B5b. Over this shaft, disposed from the side of the engine EG (i.e., from the right side of the drawing in FIG. 1) are a differential drive gear GFV, a first speed driven gear G1N, a fourth, fifth and sixth speed driven gear G456N and a second and third speed and reverse driven gear G23RN. Here, the differential drive gear GFV, the first speed driven gear G1N, the fourth, fifth and sixth speed driven gear G456N and the second and third speed and reverse driven gear G23RN are each fixed on the output shaft 50. The differential drive gear GFV always meshes with a differential driven gear GFN, which drives the differential mechanism 70 (the broken line drawn between the differential drive gear GFV and the differential driven gear GFN in FIG. 1 represents that these gears GFV and GFN mesh with each other. The same is said for FIG. 4). The first speed driven gear G1N always meshes with the first speed drive gear G1V, which is provided on the intermediary shaft 20, and the fourth, fifth and sixth speed driven gear G456N always meshes both with the fourth and sixth speed drive gear G46V, which is provided on the input shaft 10, and with the fifth speed drive gear G5V, which is provided on the intermediary shaft 20. The second and third speed and reverse driven gear G23RN always meshes both with the third speed and reverse drive gear G3RV, which is provided on the input shaft 10, and with the second speed drive gear G2V, which is provided on the intermediary shaft 20.

The reversing idle shaft 60 is supported also rotatably by bearings B6a and B6b, and a reverse idle gear GRI is fixed on this shaft. The reverse idle gear GRI always meshes both with the third speed and reverse drive gear G3RV, which is provided on the input shaft 10, and with the reverse drive gear GRV, which is provided on the countershaft 30.

The differential mechanism 70 has a differential mechanism 73 in a differential case 71, the differential mechanism 73 comprising two differential pinions 72a and two side gears 72b. Right and left axles ASR and ASL, which are disposed in parallel with the output shaft 50, are fixed to the side gears 72b, respectively, and the differential case 71 is supported by bearings B7a and B7b. In this condition, the differential case 71 can rotate around the axis of the right and left axles ASR and ASL, which have, correspondingly, right and left drive wheels WR and WL (front wheels of the vehicle). Because the differential driven gear GFN, which is fixed on the differential case 71, always meshes with the differential drive gear GFV as mentioned above, the whole of the differential mechanism 70 rotates around the right and left axles ASR and ASL as the output shaft 50 rotates.

Now, in reference to FIG. 1 and to FIG. 2, power transmission paths available in the transmission 1 are described in relation to the condition of the transmission 1. FIG. 2 is a table describing relations between the operational condition of the first~sixth clutches CT1, CT2, CT3, CT4, CT5 and CT6 and the selective clutch CTD and the speed change ratios of the transmission 1. The columns with headings CT1, CT2, CT3, CT4, CT5 and CT6 in the table represent the corresponding clutches, respectively, and in each column, a cell marked by "ON" represents that the clutch represented by the column is set to connect the corresponding gear to the corresponding shaft (i.e., the input shaft 10 or the intermediary shaft 20). If a cell is marked by "OFF", then it represents that the clutch is set to disconnect the corresponding gear from the corresponding shaft (i.e., the input shaft 10 or the intermediary shaft 20). In each column, a cell marked by a downward arrow represents the same condition for the clutch as represented by the cell right above.

The rotational power of the engine EG is input from the crank-shaft CS through the coupling mechanism CP to the input shaft 10 of the transmission 1, and it is then transmitted through the main drive gear GM, the connecting idle gear GCC and the connecting driven gear GCN to the intermediary shaft 20. As a result, the intermediary shaft 20 rotates together with the input shaft 10 in the same rotational direction. In this condition, if the first speed clutch CT1, the second speed clutch CT2, the third speed clutch CT3, the fourth speed clutch CT4, the fifth speed clutch CT5 and the sixth speed clutch CT6 are all off, then the first speed drive gear G1V, the fifth speed drive gear G5V and the second speed drive gear G2V are all disconnected rotationally from the intermediary shaft 20; the fourth and sixth speed drive gear G46V and the third speed and reverse drive gear G3RV are also disconnected from the input shaft 10; and the main driven gear GMN is disconnected from the countershaft 30. As a result, the rotational power of the engine EG is not transmitted to the output shaft 50. This is a neutral condition of the transmission 1. In this neutral condition, the selector SL of the selective clutch CTD is positioned to the fourth speed drive gear G4V In other words, the fourth speed drive gear G4V is engaged to the countershaft 30 while the reverse drive gear GRV is disengaged from the countershaft 30.

To switch the transmission 1 from the above described neutral condition to a forward first speed condition, the first speed clutch CT1 is turned from "OFF" to "ON" to connect the first speed drive gear G1V to the intermediary shaft 20. In this condition, or the forward first speed condition of the transmission 1, the power of the engine EG, which is transmitted from the input shaft 10 through the main drive gear GMV, the connecting idle gear GCC and the connecting driven gear GCN to the intermediary shaft 20, is transmitted by the first speed clutch CT1 through the first speed drive gear G1V and the first speed driven gear G1N to the output shaft 50.

To switch the transmission 1 from the forward first speed condition to a forward second speed condition, the first speed clutch CT1 is turned from "ON" to "OFF", and the second speed clutch CT2 is turned from "OFF" to "ON". As a result, the first speed drive gear G1V is disconnected from the intermediary shaft 20 while the second speed drive gear G2V is connected to the intermediary shaft 20. In this condition, or the forward second speed condition of the transmission 1, the power of the engine EG, which is transmitted from the input shaft 10 through the main drive gear GMV, the connecting idle gear GCC and the connecting driven gear GCN to the intermediary shaft 20, is transmitted by the second speed clutch CT2 through the second speed drive gear G2V and the second and third speed and reverse driven gear G23RN to the output shaft 50.

To switch the transmission 1 from the forward second speed condition to a forward third speed condition, the second speed clutch CT2 is turned from "ON" to "OFF", and the third speed clutch CT3 is turned from "OFF" to "ON". As a result, the second speed drive gear G2V is disconnected from the intermediary shaft 20 while the third speed and reverse drive gear G3RV is connected to the input shaft 10. In this condition, or the forward third speed condition of the transmission 1, the power of the engine EG is transmitted from the input shaft 10 by the third speed clutch CT3 through the third speed and reverse drive gear G3RV and the second and third speed and reverse driven gear G23RN to the output shaft 50.

To switch the transmission 1 from the forward third speed condition to a forward fourth speed condition, the third speed clutch CT3 is turned from "ON" to "OFF", and the fourth speed clutch CT4 is turned from "OFF" to "ON". As a result, the third speed and reverse drive gear G3RV is disconnected from the input shaft 10 while the main driven gear GMN is connected to the countershaft 30. In this condition, or the forward fourth speed condition of the transmission 1, the power of the engine EG, which is transmitted from the input shaft 10 through the main drive gear GMV and the main driven gear GMN, is transmitted by the fourth speed clutch CT4 to the countershaft 30. This rotation is then transmitted by the selective clutch CTD through the fourth speed drive gear G4V, the fourth and sixth speed drive gear G46V (rotating over the input shaft 10) and the fourth, fifth and sixth speed driven gear G456N to the output shaft 50.

To switch the transmission 1 from the forward fourth speed condition to a forward fifth speed condition, the fourth speed clutch CT4 is turned from "ON" to "OFF", and the fifth speed clutch CT5 is turned from "OFF" to "ON". As a result, the main driven gear GMN is disconnected from the countershaft 30 while the fifth speed drive gear G5V is connected to the intermediary shaft 20. In this condition, or the forward fifth speed condition of the transmission 1, the power of the engine EG, which is transmitted from the input shaft 10 through the main drive gear GMV, the connecting idle gear GCC and the connecting driven gear GCN to the intermediary shaft 20, is transmitted by the fifth speed clutch CT5 through the fifth speed drive gear G5V and the fourth, fifth and sixth speed driven gear G456N to the output shaft 50.

To switch the transmission 1 from the forward fifth speed condition to a forward sixth speed condition, the fifth speed clutch CT5 is turned from "ON" to "OFF", and the sixth speed clutch CT6 is turned from "OFF" to "ON". As a result, the fifth speed drive gear G5V is disconnected from the intermediary shaft 20 while the fourth and sixth speed drive gear G46V is connected to the input shaft 10. In this condition, or the forward sixth speed condition of the transmission 1, the power of the engine EG is transmitted from the input shaft 10 by the sixth speed clutch CT6 through the fourth and sixth speed drive gear G46V and the fourth, fifth and sixth speed driven gear G456N to the output shaft 50.

To switch the transmission 1 from the above described neutral condition to a reverse speed condition, the fourth speed clutch CT4 is turned from "OFF" to "ON", and the selector SL of the selective clutch CTD is shifted from the fourth speed drive gear G4V to the reverse drive gear GRV. As a result, the main driven gear GMN is connected to the countershaft 30 while the reverse drive gear GRV is connected also to the countershaft 30. In this condition, or the reverse speed condition of the transmission 1, the power of the engine EG, which is transmitted from the input shaft 10 through the main drive gear GMV to the main driven gear GMN, is then transmitted by the fourth speed clutch CT4 to the countershaft 30 and further transmitted by the selective clutch CTD through the reverse drive gear GRV, the reverse idle gear GRI, the third speed and reverse drive gear G3RV (rotating over the input shaft 10) and the second and third speed and reverse driven gear G23RN to the output shaft 50.

In the transmission 1 as a first embodiment, which achieves six forward speed change ratios and one reverse speed change ratio as described above, the gear (fourth, fifth and sixth speed driven gear G456N) provided over the output shaft 50 to rotate the output shaft 50 in the forward direction in the forward fourth speed condition is used commonly to rotate the output shaft 50 in the forward direction also in the forward fifth speed condition and in the forward sixth speed condition. In short, this specific gear is a commonly used gear. In this way, the number of the gears to be provided over the output shaft 50 for achieving this large number of forward speed change ratios is kept relatively small. As a result, the size of the transmission 1 in its axial direction is relatively small, so the transmission 1 has a compact design.

Furthermore, in the transmission 1, the second and third speed and reverse driven gear G23RN is provided as a commonly used gear on the output shaft 50 to rotate the output shaft 50 in the forward rotational direction both in the forward second speed condition and in the forward third speed condition and also to rotate the output shaft 50 in the reversed rotational direction in the reverse speed condition. In this way, the transmission 1 is equipped with a reverse speed change ratio without increasing the size of the transmission in its axial direction.

In the construction of the transmission 1, if the connecting idle gear GCC is provided rotatably over the countershaft 30, then the connecting idle shaft 40 can be eliminated. However, the provision of the connecting idle shaft 40 to support the connecting idle gear GCC beside the countershaft 30 enables gears to be used commonly as described above and also increases the freedom in determining the ratio of each speed change condition. Also, by this arrangement, the distance between the input shaft 10 and the countershaft 30 and the distance between the countershaft 30 and the intermediary shaft 20 are made substantially equal to each other, and thereby, each distance among the shafts is kept relatively short. As a result, the diameters of the gears are made relatively small. Therefore, the diameter of the transmission case 3 is also made small, lightening the transmission greatly.

In the above described transmissions as a first embodiment, the on and off actions of the first~sixth speed clutches CT1, CT2, CT3, CT4, CT5 and CT6 for each speed change ratio are determined in correspondence to the diameters of the gears and the distances among the shafts. The combination of the on and off actions of the clutches for each speed change ratio, which is presented in the above description, is only an example. In other words, a variety of combinations of the on and off actions of the clutches are possible for the transmission 1 if the gears have different diameters with correspondingly different distances among the shafts. For example, another transmission can be designed with the same number of speed change ratios (six forward speed change ratios and one reverse speed change ratio) as the above described transmission 1 as a first embodiment by replacing the actions of the fourth speed clutch CT4 for each speed change ratio in the above described first embodiment with those of the sixth speed clutch CT6, by replacing the actions of the fifth speed clutch CT5 for each speed change ratio with those of the fourth speed clutch CT4, and by replacing the actions of the sixth speed clutch CT6 for each speed change ratio with those of the fifth speed clutch CT5 (refer to modification example 1 in the table of FIG. 3). The table in FIG. 3 lists such examples. They are modifications of the first embodiment achieved by changing the combination of the on and off actions of the first~sixth speed clutches CT1, CT2, CT3, CT4, CT5 and CT6. In the table, each modification example is described by contrasting the alphanumeric codes "CT1", . . . and "CT6" of the clutches in the first embodiment with those of the clutches in each modification example or in each row of the modification list.

Figure 4:
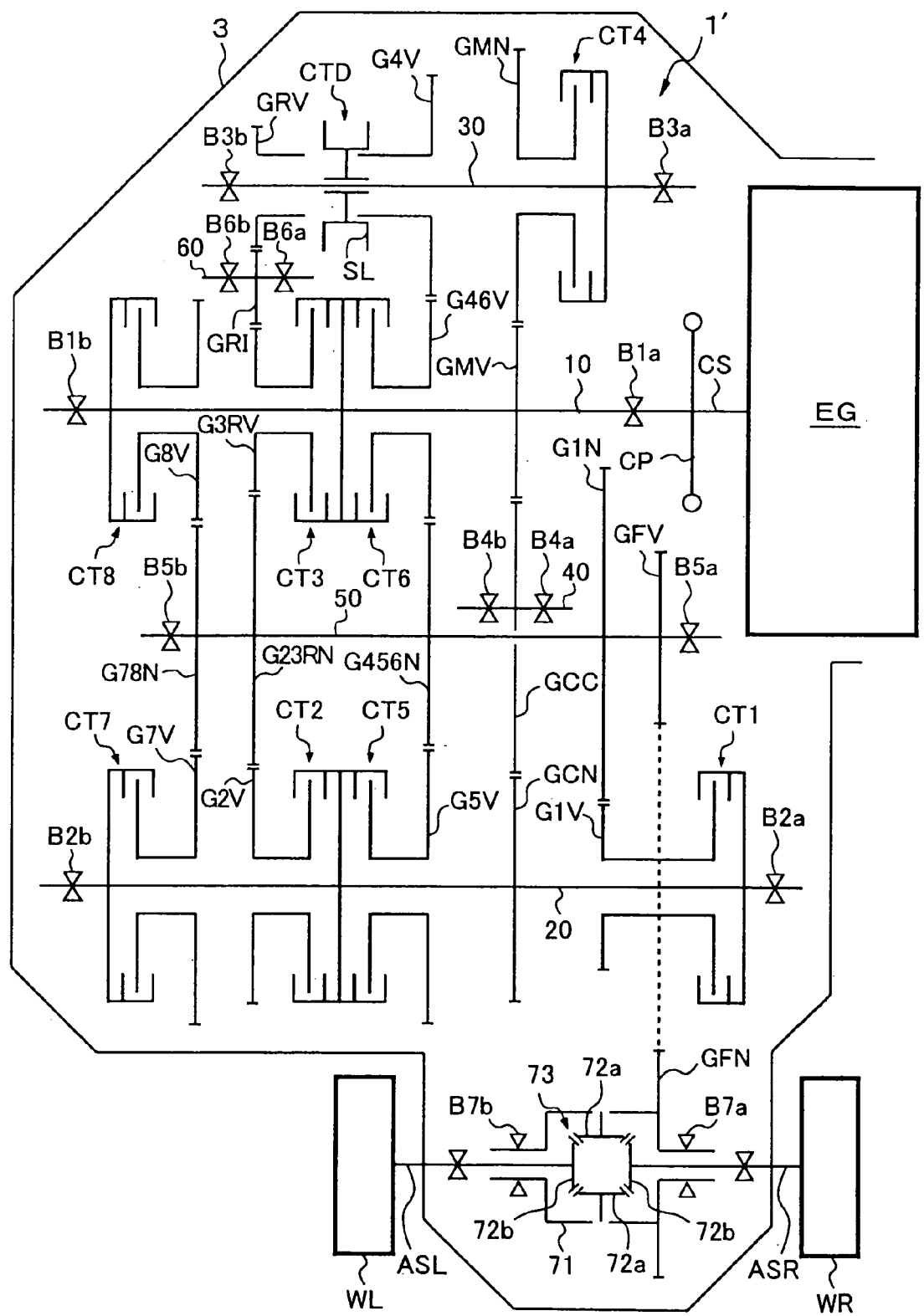
FIG. 4 is a skeleton diagram describing schematically the construction of a parallel shaft transmission as a second embodiment according to the present invention.

Next, a second embodiment of transmission according to the present invention is described in reference to FIG. 4, which shows a transmission 1' as a second embodiment. In the drawing, components that are identical with those of the transmission 1 described above as a first embodiment are given identical numbers, respectively. Differences between the transmission 1' as a second embodiment and the transmission 1 as a first embodiment are as follows: an eighth speed drive gear G8V and an eighth speed clutch CT8 are provided in this order from the side of the engine EG between the third speed and reverse drive gear G3RV and the bearing B1b over the input shaft 10; a seventh speed drive gear G7V and a seventh speed clutch CT7 are provided in this order from the side of the engine EG between the second speed drive gear G2V and the bearing B2b over the intermediary shaft 20; and a seventh and eighth speed driven gear G78N is provided between the second and third speed and reverse driven gear G23RN and the bearing B5b on the output shaft 50. In this case, the eighth speed drive gear G8V is provided rotatably over the input shaft 10, and the seventh speed drive gear G7V is provided also rotatably over the intermediary shaft 20. The seventh and eighth speed driven gear G78N, which always meshes both with the eighth speed drive gear G8V and with the seventh speed drive gear G7V, is fixed on the output shaft 50.

FIG. 5 is a table that describes relations between the operational condition of the first~eighth clutches CT1, CT2, CT3, CT4, CT5, CT6, CT7 and CT8 and the selective clutch CTD and the speed change ratios of the transmission 1' as a second embodiment. In reference to the table, the power transmission paths of the transmission 1' are described in relation to the speed change ratios of the transmission 1'. However, the condition of the clutches and the gears of the transmission 1' as a second embodiment is the same as that of the transmission 1 as a first embodiment in the following cases except that the seventh speed clutch CT7 and the eighth speed clutch CT8 are turned "OFF": the transmission 1' is in its neutral condition, is upshifted from the neutral condition to its forward first speed condition, is upshifted from the forward first speed condition to its forward second speed condition, is upshifted from the forward second speed condition to its forward third speed condition, is upshifted from the forward third speed condition to its forward fourth speed condition, is upshifted from the forward fourth speed condition to its forward fifth speed condition, is upshifted from the forward fifth speed condition to its forward sixth speed condition, and is shifted from the neutral condition to its reverse speed condition. Therefore, no description is given here for these cases.

To switch the transmission 1' as a second embodiment from the forward sixth speed condition to a forward seventh speed condition, the sixth speed clutch CT6 is turned from "ON" to "OFF", and the seventh speed clutch CT7 is turned from "OFF" to "ON". As a result, the fourth and sixth speed drive gear G46V is disconnected from the input shaft 10 while the seventh speed drive gear G7V is connected to the intermediary shaft 20. In this condition, or the forward seventh speed condition of the transmission 1', the power of the engine EG, which is transmitted from the input shaft 10 through the main drive gear GMV, the connecting idle gear GCC and the connecting driven gear GCN to the intermediary shaft 20, is transmitted by the seventh speed clutch CT7 through the seventh speed drive gear G7V and the seventh and eighth speed driven gear G78N to the output shaft 50.

To switch the transmission 1' from the forward seventh speed condition to a forward eighth speed condition, the seventh speed clutch CT7 is turned from "ON" to "OFF" while the eighth speed clutch CT8 is turned from "OFF" to "ON". As a result, the seventh speed drive gear G7V is disconnected from the intermediary shaft 20 while the eighth speed drive gear G8V is connected to the input shaft 10. In this condition, or the forward eighth speed condition of the transmission 1', the power of the engine EG from the input shaft 10 is transmitted by the eighth speed clutch CT8 through the eighth speed drive gear G8V and the seventh and eighth speed driven gear G78N to the output shaft 50.

In the above described ways, the transmission 1' as a second embodiment achieves eight forward speed change ratios and one reverse speed change ratio. In the construction of the transmission 1', the gear (seventh and eighth speed driven gear G78N) provided on the output shaft 50 for rotating the output shaft 50 in the forward direction in the forward seventh speed condition is used as a commonly used gear to rotate the output shaft 50 in the forward direction also in the forward eighth speed condition. Therefore, even though the transmission 1' as a second embodiment acquires two more forward speed change ratios additionally to those of the transmission 1 as a first embodiment, the size of the transmission 1' axially increases by the degree of only one gear, i.e., the commonly used gear, so the size in axial direction can be relatively small notwithstanding the large number of speed change ratios of the transmission 1'.

The transmission 1' as a second embodiment is equipped with the seventh speed drive gear G7V (with the seventh speed clutch CT7) and the eighth speed drive gear G8V (with the eighth speed clutch CT8) for realizing the eight forward speed change ratios. However, if either the seventh speed drive gear G7V (with the seventh speed clutch CT7) or the eighth speed drive gear G8V (with the eighth speed clutch CT8) is removed, then, of course, the transmission can be equipped only with seven forward speed change ratios.

By the way, in a structure that includes a gear train provided over three shafts with component gears meshing simultaneously, such as the structure of the above described transmissions (transmission 1 and transmission 1'), gears may experience a "sway" because of the axial thrusts generated from the contact of tooth faces of the gears during the torque transmission. As a result, a noise may be generated if the tooth bearing of the gears becomes insufficient. To avoid such discomfort, or to control the generation of such noise, the three shafts whose gears mesh with one another simultaneously, i.e., the input shaft 10, the intermediary shaft 20 and the output shaft 50, can be disposed in a common plane to reduce the effect of the "sway" of these gears.

Preferred embodiments according to the present invention have been described above. However, the scope of the present invention is not limited to the above described embodiments. For example, in the above embodiments, selective clutching means (selective clutch CTD) is used to connect either the fourth speed drive gear G4V or the reverse drive gear GRV because the fourth speed drive gear G4V and the reverse drive gear GRV are never connected simultaneously to the countershaft 30. In other words, this clutching means as a unit functions both as clutching means that connects or disconnects the fourth speed drive gear G4V to or from the countershaft 30 and as clutching means that connects or disconnects the reverse drive gear GRV to or from the countershaft 30. This arrangement is effective in lightening and compacting the transmission. However, separate clutching means may be provided instead, one for connecting or disconnecting the fourth speed drive gear G4V to or from the countershaft 30 and the other for connecting or disconnecting the reverse drive gear GRV to or from the countershaft 30. In this case, these clutching means can be the same friction clutches as used for the other clutching means.

In the above embodiments, a gear (main drive gear GMV) provided on the input shaft 10 is used as a commonly used gear both for driving the intermediary shaft 20 and for driving the countershaft 30, but two different (separate) gears may be provided on the input shaft 10 and be used one for driving the intermediary shaft 20 and the other for driving the countershaft 30. However, if a single gear provided on the input shaft 10 is used for driving both the intermediary shaft 20 and the countershaft 30 as described above, then the size of the transmission in its axial direction can be reduced by the degree of the replacement of these two gears with the single or commonly used gear.

Referring to FIG. 1 and FIG. 4, the respective transmissions may further comprise a one-way clutch between the first speed driven gear G1N and the output shaft 50. This arrangement makes the upshift from the forward first speed change ratio to the forward second speed change ratio smooth during the start-up of the vehicle because of the existence of the one-way clutch. In this case, referring to the tables of FIG. 2 and FIG. 5, the first speed clutch CT1 is turned "ON" for the forward drive range from the first speed change ratio to the sixth or eighth speed change ratio, respectively, and it is turned "OFF" for the neutral condition and for the reverse drive.

In the above embodiments, parallel shaft transmissions according to the present invention are exemplified for use in vehicles. However, these embodiments are only examples. The use of parallel shaft transmissions according to the present invention is not limited to vehicles, so it can be used in various powered machines.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A parallel shaft transmission comprising:
   an input shaft, a first idle shaft, an intermediary shaft, a countershaft and an output shaft, which are disposed in parallel with one another;
   an input-shaft first gear provided on said input shaft;
   an input-shaft second gear, which is provided rotatably on said input shaft;
   first clutching means, which connects or disconnects said input-shaft second gear to or from said input shaft;
   a first idle gear, which is provided on said first idle shaft to mesh with said input-shaft first gear;
   an intermediary shaft first gear, which is provided on said intermediary shaft to mesh with said first idle gear;
   an intermediary shaft second gear, which is provided rotatably on said intermediary shaft;
   second clutching means, which connects or disconnects said intermediary shaft second gear to or from said intermediary shaft;

an output-shaft first gear, which is provided on said output shaft to mesh with said input-shaft second gear and with said intermediary shaft second gear;

a countershaft first gear, which is provided on said countershaft to mesh with said input-shaft first gear;

a countershaft second gear, which is provided on said countershaft to mesh with said input-shaft second gear; and power-switching means, which enables or disables power transmission between said countershaft and said countershaft second gear.

2. The parallel shaft transmission as set forth in claim 1, further comprising:

an intermediary shaft fourth gear which is provided rotatably on said intermediary shaft;

eighth clutching means, which connects or disconnects said intermediary shaft fourth gear to or from said intermediary shaft; and an output-shaft third gear which is provided on said output shaft to mesh with said intermediary shaft fourth gear.

3. The parallel shaft transmission as set forth in claim 1, further comprising:

an input-shaft fourth gear, which is provided rotatably on said input shaft;

ninth clutching means, which connects or disconnects said input-shaft fourth gear to or from said input shaft;

an intermediary shaft fifth gear which is provided rotatably on said intermediary shaft;

tenth clutching means, which connects or disconnects said intermediary shaft fifth gear to or from said intermediary shaft; and an output-shaft fourth gear, which is provided on said output shaft to mesh with said input-shaft fourth gear and with said intermediary shaft fifth gear.

4. The parallel shaft transmission as set forth in claim 1, further comprising:

an input-shaft third gear, which is provided rotatably on said input shaft;

third clutching means, which connects or disconnects said input-shaft third gear to or from said input shaft;

an intermediary shaft third gear, which is provided rotatably on said intermediary shaft;

fourth clutching means, which connects or disconnects said intermediary shaft third gear to or from said intermediary shaft; and an output-shaft second gear, which is provided on said output shaft to mesh with said input-shaft third gear and with said intermediary shaft third gear.

5. The parallel shaft transmission as set forth in claim 4, wherein:

said countershaft second gear is provided rotatably on said countershaft; and said power-switching means includes fifth clutching means, which connects or disconnects said countershaft second gear to or from said countershaft;

said transmission further comprising:

a countershaft third gear, which is provided rotatably on said countershaft;

a second idle shaft, which is disposed in parallel with said input shaft;

a second idle gear, which is provided on said second idle shaft to mesh with said countershaft third gear and with said input-shaft third gear; and sixth clutching means, which connects or disconnects said countershaft third gear to or from said countershaft.

6. The parallel shaft transmission as set forth in claim 5, wherein:

said countershaft first gear is provided rotatably on said countershaft; and a seventh clutching means connects or disconnects said countershaft first gear to or from said countershaft.

7. The parallel shaft transmission as set forth in claim 5, wherein:

said fifth clutching means and said sixth clutching means comprise one selective clutching means, which connects selectively either said countershaft second gear or said countershaft third gear to said countershaft.

* * * * *